United States Patent
Shibayama et al.

(10) Patent No.: US 11,688,157 B2
(45) Date of Patent: Jun. 27, 2023

(54) SHOPPER ANALYSIS USING AN ACCELERATION SENSOR AND IMAGING

(71) Applicant: INTERNATIONAL BUSINESS MACHINES CORPORATION, Armonk, NY (US)

(72) Inventors: Hiroki Shibayama, Tokyo-to (JP); Taketo Matsunaga, Kanawaki (JP); Keiichiro Shimada, Fujisawa (JP); Haoxiang Qiu, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

(21) Appl. No.: 16/856,345

(22) Filed: Apr. 23, 2020

(65) Prior Publication Data

US 2021/0334523 A1 Oct. 28, 2021

(51) Int. Cl.
*G06V 10/764* (2022.01)
*G06N 20/00* (2019.01)
(Continued)

(52) U.S. Cl.
CPC .......... *G06V 10/764* (2022.01); *G06N 20/00* (2019.01); *G06V 20/52* (2022.01); *G06V 40/10* (2022.01);
(Continued)

(58) Field of Classification Search
CPC ...... G06V 20/52; G06V 10/10; G06V 10/147; G06V 10/82; G06V 40/19; G06V 40/20;
(Continued)

(56) References Cited

U.S. PATENT DOCUMENTS

| | | | | |
|---|---|---|---|---|
| 8,219,438 B1 * | 7/2012 | Moon | ............... | G06V 20/52 |
| | | | | 705/7.29 |
| 8,886,387 B1 * | 11/2014 | Agarwal | ............... | G06V 20/56 |
| | | | | 701/28 |

(Continued)

FOREIGN PATENT DOCUMENTS

| | | | |
|---|---|---|---|
| JP | 2004-534583 A | | 11/2004 |
| JP | 2011515758 A | * | 3/2008 |

(Continued)

OTHER PUBLICATIONS

Anonymous, "Face Recognition", https://github.com/ageitgey/face_recognition, GitHub, Inc., Apr. 2, 2020, 12 pages.

(Continued)

*Primary Examiner* — Nizar N Sivji
(74) *Attorney, Agent, or Firm* — Daniel Yeates; Andrew D. Wright; Calderon Safran & Cole, P.C.

(57) ABSTRACT

A method includes receiving, by a computing device, acceleration information from an acceleration sensor attached to a product; receiving, by the computing device, from an image capture device an image of a prospective purchaser of the product; determining, by the computing device, a movement of the prospective purchaser based on the acceleration information and the image, the movement being in relation to a movement of the product; and sending, by the computing device, display information to a digital display, the display information including information related to the product. The movement of the product is based on the acceleration information.

20 Claims, 13 Drawing Sheets

(51) Int. Cl.
*G06V 40/20* (2022.01)
*G06V 40/10* (2022.01)
*G06V 20/52* (2022.01)
*G06V 40/16* (2022.01)
*G06Q 30/0601* (2023.01)

(52) U.S. Cl.
CPC ............ *G06V 40/173* (2022.01); *G06V 40/23* (2022.01); *G06V 40/28* (2022.01); *G06Q 30/0623* (2013.01)

(58) Field of Classification Search
CPC ........ G06V 20/68; G06V 40/23; G06V 40/10; G06V 40/28; G06V 40/173; G06N 20/00; G06Q 30/0601; G06Q 30/0641; G06Q 30/0639; G06Q 20/203; G06Q 30/0623; G06K 2007/10524; G06K 9/6267
See application file for complete search history.

(56) References Cited

U.S. PATENT DOCUMENTS

| | | | | |
|---|---|---|---|---|
| 10,186,124 | B1* | 1/2019 | Mullins | G08B 13/19613 |
| 10,490,039 | B2* | 11/2019 | Martin | G06Q 30/0281 |
| 11,182,738 | B2* | 11/2021 | Costello | G06Q 10/087 |
| 11,188,973 | B2* | 11/2021 | Bynum | G06Q 30/0639 |
| 2008/0154429 | A1* | 6/2008 | Lee | G05D 1/027 901/1 |
| 2014/0363059 | A1 | 12/2014 | Hurewitz | |
| 2016/0086191 | A1 | 3/2016 | Fonzi et al. | |
| 2017/0228776 | A1 | 8/2017 | Walden et al. | |
| 2019/0005678 | A1* | 1/2019 | Lindner | G06T 7/74 |
| 2019/0088096 | A1* | 3/2019 | King | G08B 13/1436 |
| 2019/0108561 | A1 | 4/2019 | Shivashankar et al. | |
| 2019/0113347 | A1* | 4/2019 | Kim | G01C 21/16 |
| 2019/0205643 | A1* | 7/2019 | Liu | G06N 3/04 |
| 2019/0272557 | A1* | 9/2019 | Smith | G06N 20/00 |
| 2020/0272856 | A1* | 8/2020 | Garner | G06K 9/6257 |
| 2020/0304378 | A1* | 9/2020 | Choi | H04L 41/145 |
| 2020/0320586 | A1* | 10/2020 | Soule | G06Q 30/0282 |

FOREIGN PATENT DOCUMENTS

| | | | |
|---|---|---|---|
| JP | 2008-299803 | A | 12/2008 |
| JP | 2010-231615 | A | 10/2010 |
| JP | 2010-238100 | A | 10/2010 |
| JP | 2010-537345 | A | 12/2010 |
| JP | 2011-022633 | A | 2/2011 |
| JP | 2013-149189 | A | 8/2013 |
| JP | 2014-016745 | A | 1/2014 |
| JP | 2014-096112 | A | 5/2014 |
| JP | 2014-109539 | A | 6/2014 |
| JP | 2014-183525 | A | 9/2014 |
| JP | 2014-209357 | A | 11/2014 |
| JP | 2014-215827 | A | 11/2014 |
| JP | 2014-219707 | A | 11/2014 |
| JP | 2015-136044 | A | 7/2015 |
| JP | 2016-186798 | A | 10/2016 |
| JP | 2016-218919 | A | 12/2016 |
| WO | 2005111880 | A1 | 7/2008 |
| WO | WO-2009117162 A1 * | 9/2009 | ............. G01S 11/06 |

OTHER PUBLICATIONS

Anonymous, "Pose Detection in the Browser: PoseNet Model", https://github.com/tensorflow/tfjs-models/tree/master/posenet, GitHub, Inc., Apr. 2, 2020, 12 pages.

Mell et al., "The NIST Definition of Cloud Computing", NIST, Special Publication 800-145, Sep. 2011, 7 pages.

* cited by examiner

SHOPPER ANALYSIS USING AN ACCELERATION SENSOR AND IMAGING

BACKGROUND

Aspects of the present invention relate generally to computer-based shopper analysis and, more particularly, to analyzing movements of a shopper to determine the shopper's interest in a product.

In retail stores, clerks are often assigned to each sales floor to attend to shoppers and provide product explanation to the shoppers. Managers specify the specific number of the clerks, sometimes according to the areas of the sales floors. Some stores contain products with complex functions and/or a larger number of the products. In some cases, it can be advantageous to track which product a shopper is interested in and which product is compared with another product.

SUMMARY

In a first aspect of the invention, there is a computer-implemented method including: receiving, by a computing device, acceleration information from an acceleration sensor attached to a product; receiving, by the computing device, from an image capture device an image of a prospective purchaser of the product; determining, by the computing device, a movement of the prospective purchaser based on the acceleration information and the image, the movement being in relation to a movement of the product; and sending, by the computing device, display information to a digital display, the display information including information related to the product. The movement of the product is based on the acceleration information.

In another aspect of the invention, there is a computer program product including one or more computer readable storage media having program instructions collectively stored on the one or more computer readable storage media. The program instructions are executable to: receive acceleration information from an acceleration sensor attached to a product, the acceleration information indicating a movement of the acceleration sensor; receive from an image capture device an image captured by the image capture device of a prospective purchaser of the product; determine a movement of the prospective purchaser based on the acceleration information and the image, the movement being in relation to a movement of the product; and send information to a storage device, the information including the movement of the prospective purchaser and information related to the product. The determine a movement of the prospective purchaser comprises utilizing a machine learning model that focuses on skeletal structures of the prospective purchaser based on the image, and the movement of the product is based on the acceleration information.

In another aspect of the invention, there is system including a processor, a computer readable memory, one or more computer readable storage media, and program instructions collectively stored on the one or more computer readable storage media. The program instructions are executable to: receive acceleration information from an acceleration sensor attached to a product; receive from an image capturing device an image of a prospective purchaser of the product; determine a movement of the prospective purchaser based on the acceleration information and the image, the movement being in relation to a movement of the product; and send user display information to a digital display, the user display information suggesting to a user of the computing device that the user perform an action relative to the prospective purchaser. The movement of the product is based on the acceleration information, and the action suggested is based on the determined movement of the prospective purchaser.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
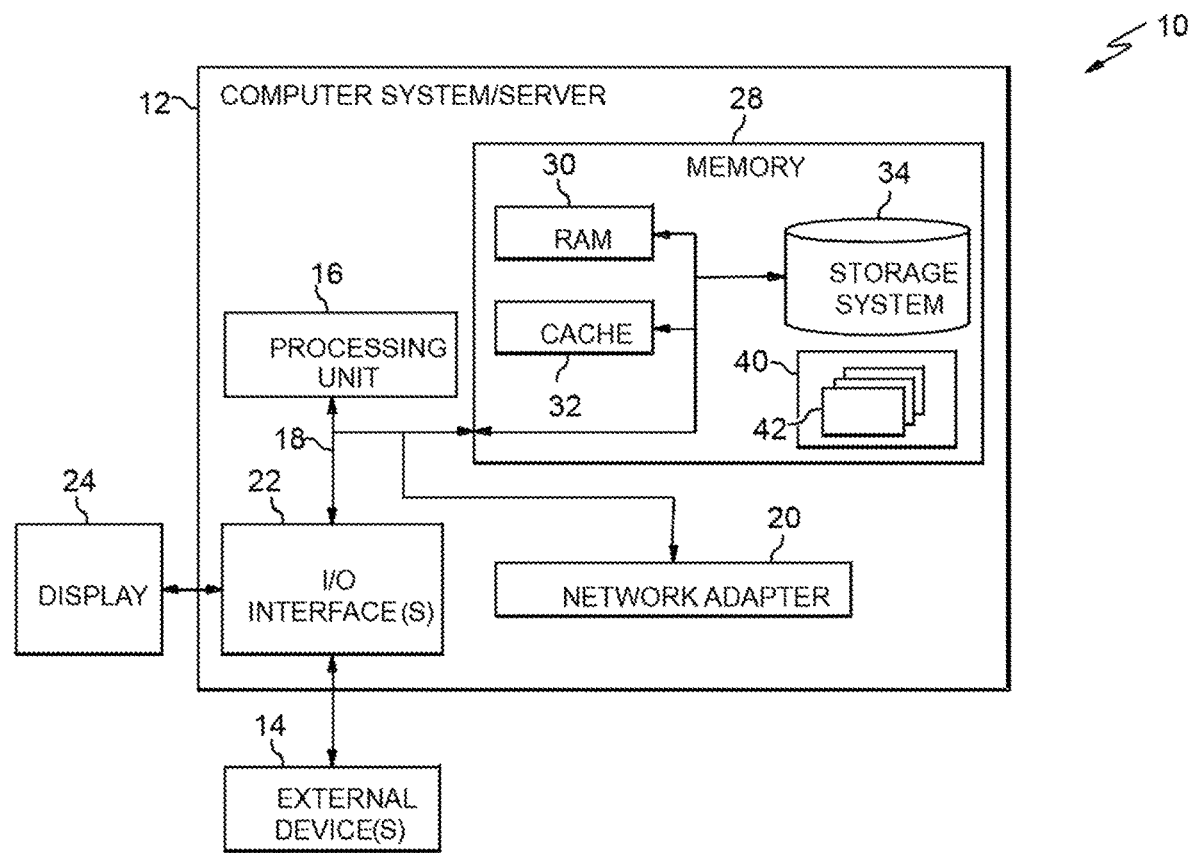
FIG. 1 depicts a cloud computing node according to an embodiment of the present invention.

Aspects of the present invention relate generally to computer-based shopper analysis and, more particularly, to analyzing movements of a shopper to determine the shopper's interest in a product. According to aspects of the invention an acceleration sensor is attached to a product in a store, and images from, for example, cameras installed on a sales floor are analyzed. In embodiments, a computing device receives acceleration information from an acceleration sensor attached to a product; the computing device receives from an image capture device an image of a prospective purchaser of the product; the computing device determines a movement of the prospective purchaser based on the acceleration information and the image, the movement being in relation to a movement of the product; and the computing device sends display information to a digital display, the display information including information related to the product, wherein, the movement of the product is based on the acceleration information. In this manner, implementations of the invention reveal the movement of a shopper prior to purchasing the product and contribute to improvement in real-time shopper service and, as well, provide product placement and quantity suggestions to management based on analysis of data collected.

Embodiments of the invention include a computer implementation method for detecting shoppers comparing products. In embodiments, the method comprises: extracting image data of a shopper raising one of the products, including time information; extracting product identification data and product acceleration sensor data, including time information; matching the time information of the image data and the time information of the sensor data; extracting second image data of the shopper raising one of the products, including time information; extracting product identification data of a second product and product acceleration sensor data of the second product, including time information; matching the time information of second image data of the shopper raising one of the products with the time information of the product identification data of a second product and product acceleration sensor data of the second product; and detecting that the extracting image data of a shopper handling one of the products, extracting product identification data and product acceleration sensor data, the matching the time information of the image data and the time information of the sensor data, the extracting second image data, the extracting product identification data of a second product and product acceleration sensor data of the second product, and the matching the time information of second image data, are conducted within a certain time.

In embodiments, the method further comprises: extracting image data of the shopper replacing one of the products, including time information; extracting product identification data and product acceleration sensor data of the replacing of the one of the products, including time information; and matching the time information of the extracting image data of the shopper replacing one of the products with the extracting product identification data and product acceleration sensor data of the replacing of the one of the products.

Implementations of the disclosure are a practical application because they improve the technology of digital analysis of a shopper by combining acceleration data from an acceleration sensor and an image from an image capture device to determine an action being taken by the shopper. For example, determining that a shopper is comparing two products by determining that the shopper has picked up the two products with different hands at the same time, where the determining that the shopper has picked up two the products results from combining acceleration data and an image can improve the accuracy of a computer system that analyzes intentions of a shopper.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
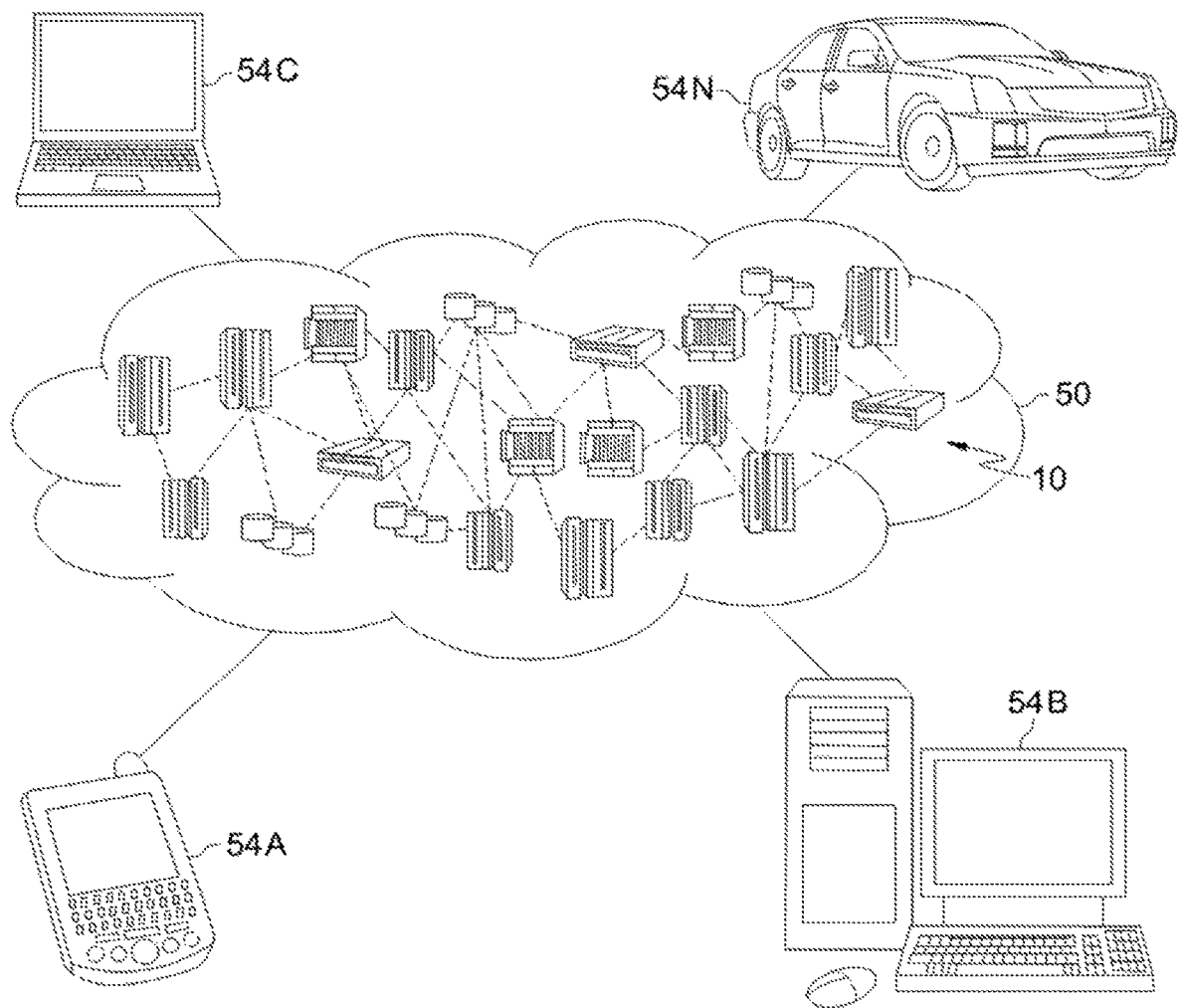
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
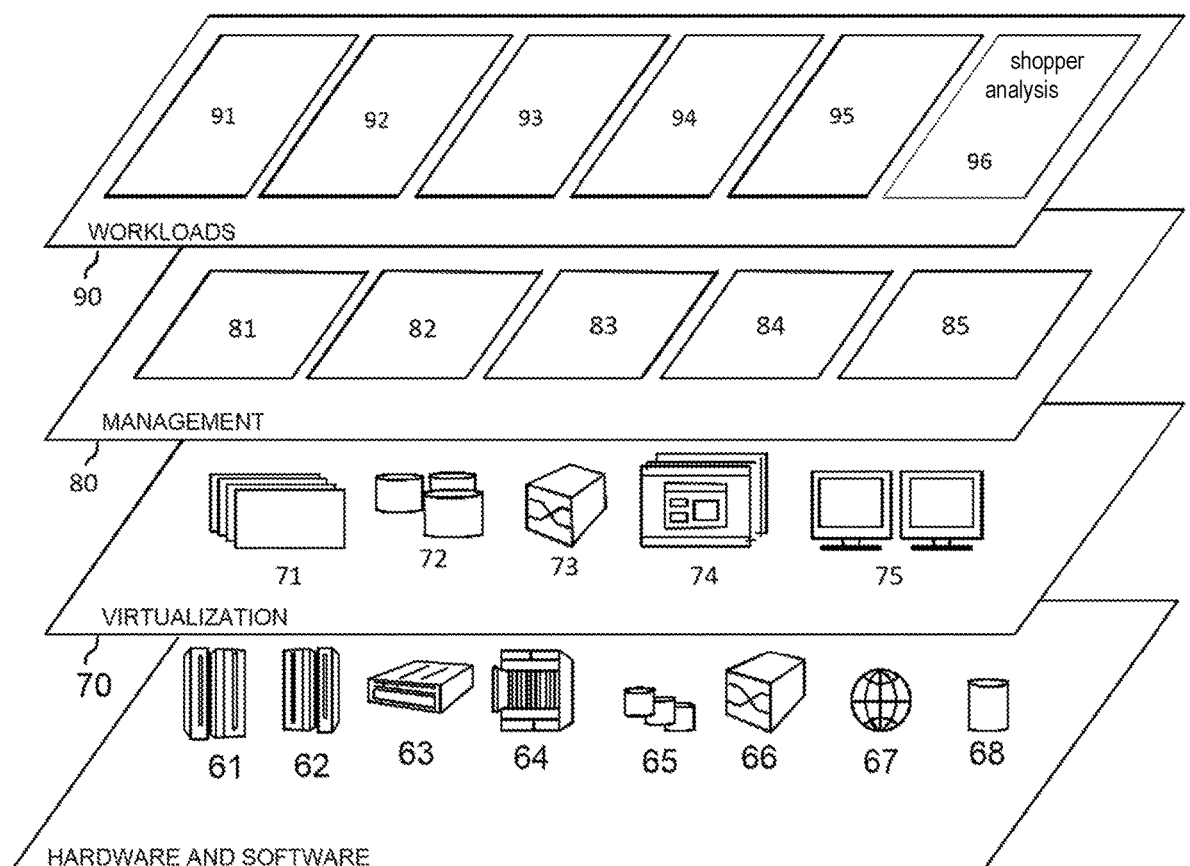
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and shopper analysis 96.

Implementations of the invention may include a computer system/server 12 of FIG. 1 in which one or more of the program modules 42 are configured to perform (or cause the computer system/server 12 to perform) one of more functions of the shopper analysis 96 of FIG. 3. For example, the one or more of the program modules 42 may be configured to: receive acceleration information from an acceleration sensor attached to a product; receive from an image capturing device an image of a prospective purchaser of the product; determine a movement of the prospective purchaser of the product based on the acceleration information and the image, the movement being in relation to a movement of the product; and send user display information to a digital display, the user display information suggesting to a user of the computing device that the user perform an action relative to the prospective purchaser, wherein, the movement of the product is based on the acceleration information, and the action suggested is based on the determined movement of the prospective purchaser.

Figure 4:
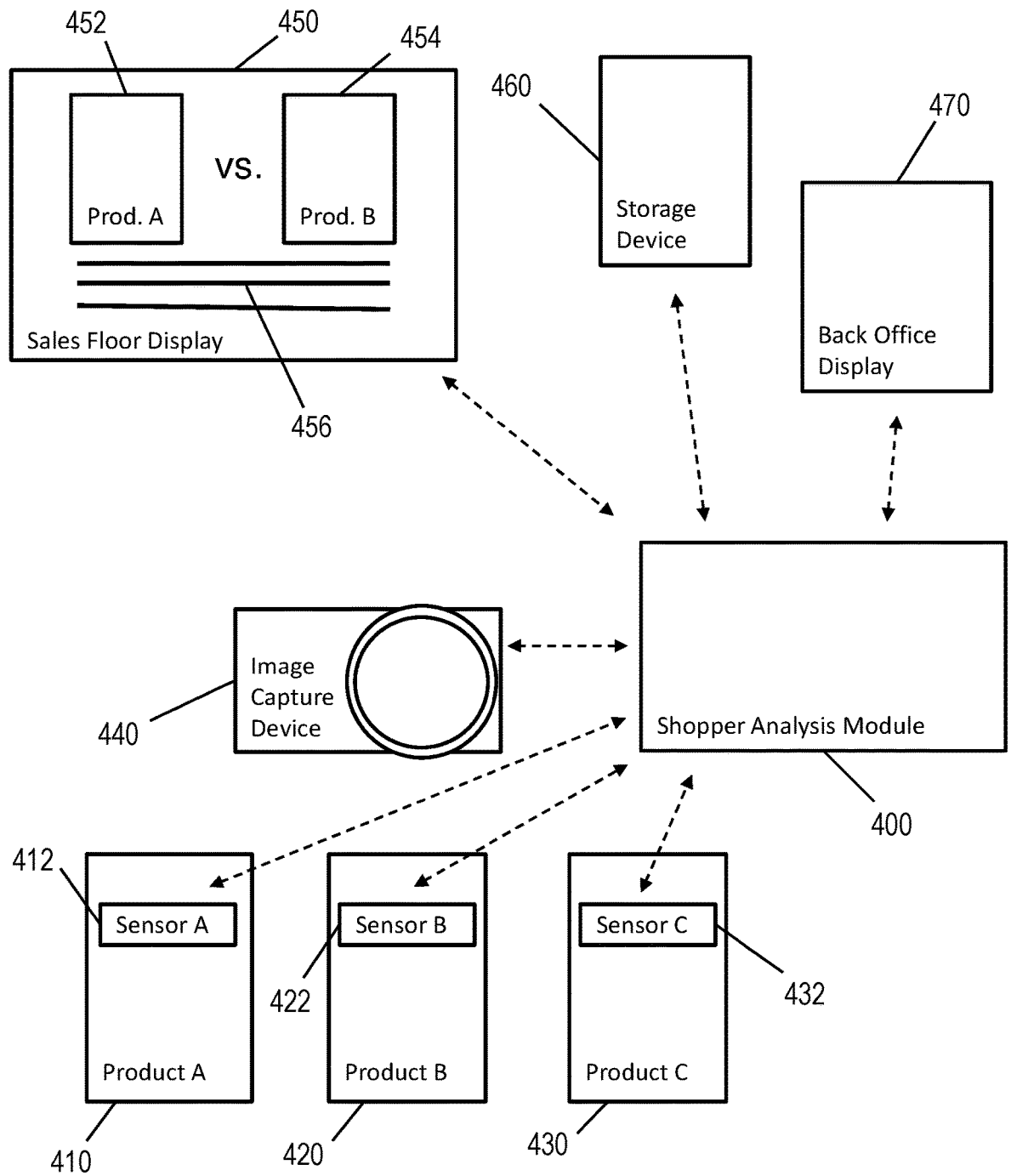
FIG. 4 shows a block diagram of an exemplary environment in accordance with aspects of the invention.

FIG. 4 shows a block diagram of an exemplary environment in accordance with aspects of the invention. In embodiments, the environment includes a number of products, each of which has attached to it an acceleration sensor. In the example shown in FIG. 4, a product A 410 has an acceleration sensor A 412 attached to it. Similarly, a product B 420 has an acceleration sensor B 422 attached to it, and a product C 430 has an acceleration sensor C 432 attached to it. In embodiments, acceleration sensor A 412 detects when product A 410 is moved. Similarly, acceleration sensor B 422 detects when product B 420 is moved, and acceleration sensor C 432 detects when product C 430 is moved. In this example, an image capture device 440 such as, for example, a camera, is positioned to capture images of shoppers handling one or more of products 410, 420, 430.

In the example shown in FIG. 4, a shopper analysis module 400, such as, for example, one or more program modules (e.g., 42) of a computing device (e.g., 12) receives data from one or more of sensor A 412, sensor B 422, sensor C 432, and image capture device 440. In embodiments, shopper analysis module 400 processes the data received from sensor A 412, sensor B 422, sensor C 432, and/or image capture device 440 to determine actions made by the shopper relative to one or more of products 410, 420, 430. In embodiments, shopper analysis module 400 sends instructions to a sales floor display 450, a storage device 460, and/or a back office display 470 based on the determination made by shopper analysis module 400.

In the example shown in FIG. 4, shopper analysis module 400 determines that the shopper is comparing product A 410 and product B 420 and, as a result, instructs sales floor display 450 to display an image 452 of product A 410 and an image 454 of product B 420. In this example, shopper analysis module 400 also instructs sales floor display 450 to display text or other information 456 relevant to a comparison of product A 410 and product B 420. For example, in an embodiment where product A 410 and product B 420 are laptop computers, shopper analysis module 400 instructs sales floor display 450 to display text 456 that compares internal disk space, processor speed, and screen resolution of both product A 410 and product B 420 for the shopper's use in comparing product A 410 to product B 420. Continuing with the example of product A 410 and product B 420 being laptop computers, in embodiments, shopper analysis module 400 instructs sale floor display 450 to display images such as, for example, screen shots of an image on the screens of both product A 410 to product B 420 for the shopper's use in comparing resolution and color reproduction of product A 410 to product B 420.

In embodiments, shopper analysis module 400 stores information associated with movement of products 410, 420, 430 on storage device 460. In embodiments, the information stored includes product name, date of movement, and type of movement. In embodiments, shopper analysis module 400 performs analysis on the information stored on storage device 460 to identify patterns of shoppers relative to particular products, and other metrics regarding product movement and product sales.

In embodiments, shopper analysis module 400 instructs back office display 470 to display information regarding movements of individual products (for example, number of times product was lifted, movement duration, movement time, etc.) and movements of combinations of products (for example, pairs of products lifted together, products picked up on the way to a cashier after picking up a different product, pairs of products returned to the shelf together, etc.). In embodiments, shopper analysis module 400 stores this information with numerical representations and performs analysis on the information to make predictions as to future sales of the products.

In embodiments, shopper analysis module 400 identifies attributes of a shopper that picks up product B 420 by analyzing images of the shopper captured by image capture device 440. In embodiments, shopper analysis module 400 uses facial recognition to identify that shopper as the same shopper that picked up product A 410. In embodiments, shopper analysis module 400 detects movements of products 410, 420, 430 by receiving data from acceleration sensors 412, 422, 432, respectively.

In embodiments, shopper analysis module 400 develops suggestions regarding locations for placement of products on a sales floor to optimize sales. For example, in embodiments, when shopper analysis module 400 determines that product A 410 and product B 420 are often compared to one another, shopper analysis module 400 sends a suggestion to back office display 470 that product A 410 and product B 420 should be closer together on the sales floor. A manager or other worker in the store can then relocated product A 410 and/or product B 420 such that they are closer together on the sales floor. In embodiments, shopper analysis module 400 monitors shopper behavior (as described above, for example) to determine if the relocation of product A 410 and/or product B 420 resulted in higher sales.

In embodiments, sensors 412, 422, 432 detect the movement of each product 410, 420, 430 and shopper analysis module 400 analyzes images of shoppers captured by image capture device 440 to detect shopper behaviors. In embodiments, shopper analysis module 400 detects shopper movements including lifting (an action of a shopper picking up a product placed on a shelf), consideration (an action of a shopper examining a product while holding it in their hand), comparison (an action of a shopper comparing multiple products while holding them in one or both of their hands), and returning (an action of a shopper returning a product to a shelf).

In embodiments, shopper analysis module 400 determines lifting, consideration, comparison, and returning by utilizing a machine learning model that focuses on skeletal structures of the shopper to understand what the shopper is doing based on the posture of the shopper. In embodiments, shopper analysis module 400 improves the accuracy of the determination (lifting, consideration, comparison, returning) by combining information from acceleration sensors 412, 422, 432 with the model-based determination. For example, in embodiments, shopper analysis module 400 considers data from sensors 412, 422, 432 identifying a longer distance of product movement in conjunction with results of analysis by a machine learning model to determine that the shopper is considering the product (as opposed to simply lifting and returning the product).

In embodiments, shopper analysis module 400 performs facial recognition of a shopper that considered product A 410 and performs facial recognition of a shopper that considered product B 420 to determine if it is the same shopper that considered both products. This is particularly helpful when a shopper compares products that are located such that the shopper must move to different locations in the store to pick up each product.

In embodiments, shopper analysis module 400 performs analysis on images captured by image capture device 440 to determine one or more attributes of a shopper. In embodiments, shopper analysis module 400 compares images captured by image capture device 440 with known images stored on storage device 460 or some other storage device. In embodiments, shopper analysis module 400 stores (on, for example, storage device 460) correlations between particular products and attributes of shoppers that considered the particular products. In embodiments, shopper analysis module 400 uses those correlations to predict (in real time) other products that may be of interest to shoppers having those particular attributes.

In embodiments, shopper analysis module 400 sends instructions to sales floor display 450 to display information corresponding to the movement of the product to provide a real-time automatic shopper service. The content of these instructions depends on the movement of the product determined by shopper analysis module 400 (lifting, consideration, comparison, or returning).

In embodiments, when shopper analysis module 400 determines that the movement of the product is lifting or considering, shopper analysis module 400 sends instructions to sales floor display 450 to display description information of the product lifted such as, for example, price, performance, similar products, etc., in real-time. Real-time display is beneficial because some shoppers will return a product to the shelf very quickly if not interested, in some cases within one second. In embodiments, when shopper analysis module 400 determines that the movement of the product is comparison, shopper analysis module 400 sends instructions to sales floor display 450 to display product comparison information of the two (or more) products lifted such as, for example, comparison of price and performance, etc. In embodiments, when shopper analysis module 400 determines that the movement of the product is returning, shopper analysis module 400 sends instructions to sales floor display 450 to clear sale floor display 450 of information regarding the product returned. In embodiments, shopper analysis module 400 delays sending the instruction to clear sales floor display 450 for a predetermined period of time (for example, 5 seconds) after the product is returned.

In embodiments, shopper analysis module 400 sends instructions to light producing and/or sound producing devices directed to or near another product or products to emphasize the other product or products as similar to the product that is being/was lifted, considered, compared, or returned. In embodiments, sales floor display 450 is an interactive display such as, for example, a touch screen, that the shopper operates to obtain more information about the product and/or related products. In embodiments, shopper analysis module 400 sends instructions to a sound producing device to produce audible information related to the product and/or related products.

In embodiments, shopper analysis module 400 evaluates the movements and attributes of the shopper to obtain knowledge regarding the shopper. In embodiments, pieces of data that shopper analysis module 400 obtains from sensor A 412 include: knowledge that the shopper picked up product A 410; an elapsed period of time from the time at which the shopper picked up product A 410 to the time at which the shopper put product A 410 down; a behavior of the shopper during the time which the shopper carried product A 410; and an elapsed period of time during which the shopper carried product A 410. In embodiments, shopper analysis module 400 also evaluates attribute data associated with product A 410 such as, for example, name, category, size, product display location, etc., which is, in some embodiments, assigned to product A 410 before product A 410 is placed on the sales floor.

In embodiments, shopper analysis module 400 evaluates the movements and attributes of the shopper by using the above-described data as parameters in various statistical analysis schemes (statistical test, multivariate analysis, deep learning, etc.). As examples of analysis, shopper analysis module 400 considers whether a product was chosen and carried or returned to the shelf, and the product attributes to perform clustering of products. For example, in embodiments, shopper analysis module 400 clusters products based on one or more attributes of the shopper, as well as the product comparison consideration information and the result of selection of the product for purchase. In embodiments, this clustering is of not only the products but also the attributes of possible target shoppers. In embodiments, shopper analysis module 400 analyzes the clustering for categorization of products. With this clustering, shopper analysis module 400 categorizes products to determine a possibility of combined sale of products. In embodiments, shopper analysis module 400 assigns appeal points to particular products in a group (or cluster) of products that are compared and carried by the shopper (indicating that the shopper chose a particular product over another product after comparing them).

In embodiments, shopper analysis module 400 determines one or more attributes of the shopper such as by performing facial recognition on images obtained from image capture device 440. In embodiments, shopper analysis module 400 uses facial recognition to identify a shopper as the same shopper that picked up the particular product at other locations in the store and/or at other times. Embodiments include an additional image capture device for the above shopper recognition.

Additionally, in some embodiments, the shopper analysis module 400 uses facial recognition to compare images of the shopper with member images provided by shoppers in creating a membership in order to identify the shopper. By identifying the shopper, the shopper analysis module 400 can also obtain attributes of the shopper from membership information voluntarily provided by the shopper and possessed by the store, such as age, gender, brand preferences, purchase history, etc. In embodiments, shopper analysis module 400 considers additional information when performing the above analysis such as, for example: purchase information (point of sale data) (POS data) and membership information possessed by the store; environmental information related to purchasing such as weather and temperature; places and content of store point of purchase (POP) advertising, and presence and duration of other advertising; and other data related to sales and marketing acquired or accumulated by stores.

In embodiments, shopper analysis module 400 analyzes some or all of the above information and data using one or more of various statistical analysis schemes. For example, in embodiments, shopper analysis module 400 performs multiple regression analyses with a product that a shopper picked up and considered, while considering one or more attributes of the shopper (such as but not limited to an age group of the shopper), to: predict a trend of future demand and purchasing; perform A/B testing based on the period of time for which the product is picked up and considered and the content of the POP advertising so as to measure the effectiveness of marketing efforts, store displays, and the like; and perform effective analysis that contributes to store management over a wider range of issues.

In embodiments, a manager or other worker in a store uses the results of the analysis by shopper analysis module 400 to improve product placement and advertising efforts. For example, workers place products adjacent to each other according to information on frequently compared products so as to facilitate a more productive store layout. In another example, workers place POP advertising that promotes understanding of products that attract attention or interest but are returned to the shelf immediately. In another example, workers place a display device (such as, for example, sales floor display 450) to display instant information providing product description clarification, an appeal rating based on appeal points, and/or recommendation information for products having the possibility of combined sale with the subject product (in embodiments, shopper analysis module 400 sends an instruction to display this information on a mobile terminal possessed by the shopper). In another example, shopper analysis module 400 instructs an in-store terminal (such as other store terminal 451 in FIG. 5) to display for workers the product that is currently being considered, and provides description information of the product that the workers can use to complete a sale of the product and, potentially, an associated product. In another example, shopper analysis module 400 selectively issues product descriptions and recommendations for each attribute of the shopper on the basis of the shopper information obtained from image capture device 440 or an additional image capture device. In another example, shopper analysis module 400 considers parameters such as weather and temperature, and performs demand and trend forecasts for climate and seasonal changes in order to motivate a shopper to purchase a product that the shopper would not buy without knowledge of the forecasts for climate and seasonal changes. In another example, shopper analysis module 400 provides messages useful to workers in creating effective flyers, POP advertising, and sales talk on the basis of purchase information, POP advertising information, other advertising information, and the history of the shopper having picked up the product, and the duration of the shopper's consideration of the product.

Figure 5:
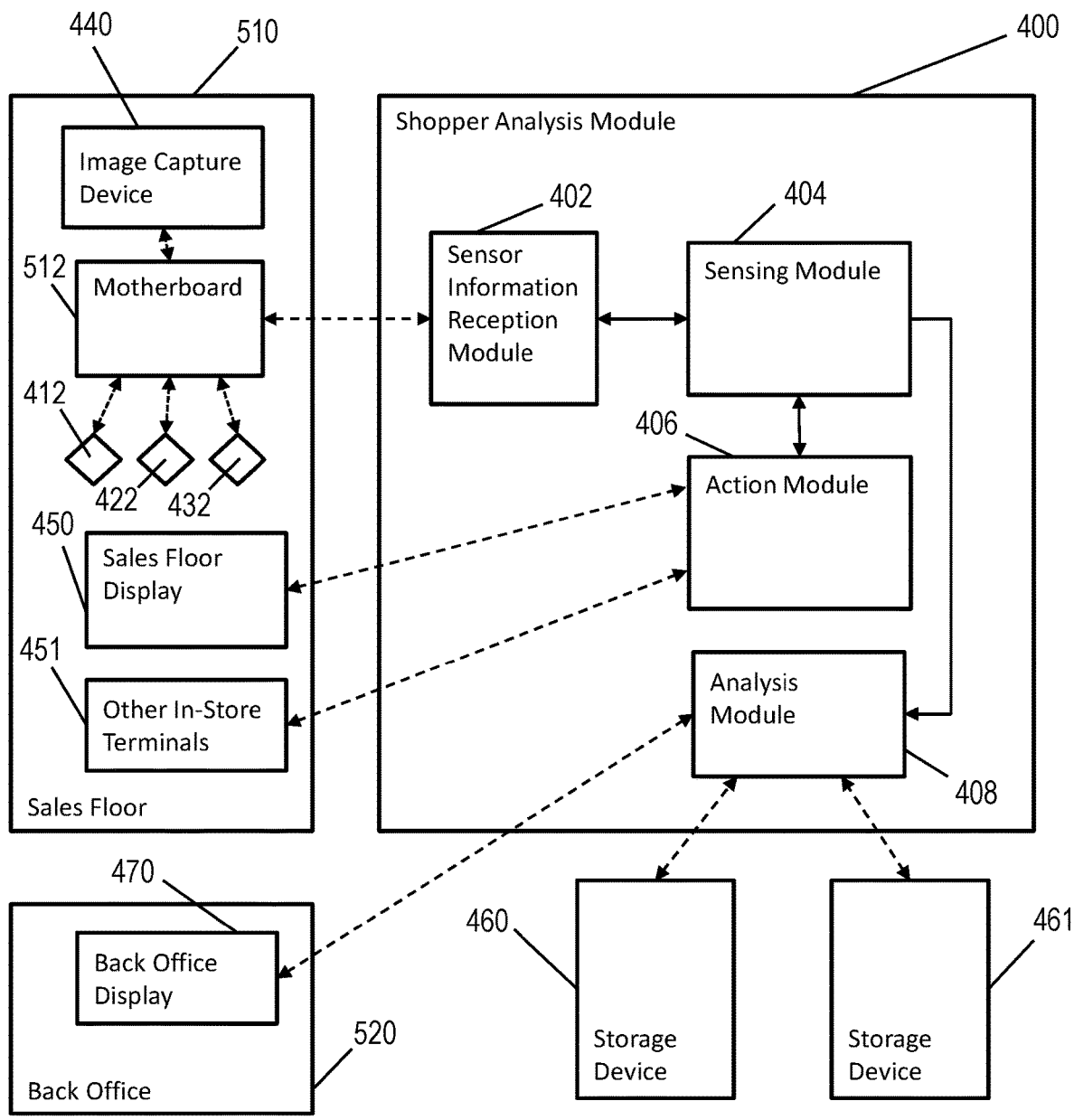
FIG. 5 shows a block diagram of an exemplary environment in accordance with aspects of the invention.

FIG. 5 shows a block diagram of an exemplary embodiment of the invention. Various elements of the embodiment shown in FIG. 4 are also shown in FIG. 5. In this embodiment, image capture device 440, sensors 412, 422, 432, sales floor display 450 and other in-store terminals 451 are located on a sales floor 510. Also shown on sales floor 510 is a motherboard 512 that processes information from image capture device 440 and sensors 412, 422, 432 and relays it to shopper analysis module 400. In this embodiment, back office display 470 is located in a back office 520 that is located remotely from sales floor 510. In this embodiment, historical data relating to facial recognition, generic shopper trends, and other related information is stored on a storage device 461.

In the embodiment shown in FIG. 5, shopper analysis module 400 includes a sensor information reception module 402 that receives (through motherboard 512) information from sensors 412, 422, 432 and image capture device 440 and sends the information to a sensing module 404. In embodiments, sensor information reception module 402 recognizes changes in acceleration sensed by sensors 412, 422, 432.

In the embodiment shown in FIG. 5, shopper analysis module 400 includes sensing module 404 that receives information from sensor information reception module 402. Sensing module 404 analyzes information received (through sensor information reception module 402) from sensors 412, 422, 432 and image capture device 440 and converts that information into the movements and/or attributes of the shopper in relation to the product (explained above). After the conversion, sensing module 404 sends the movements and/or attributes of the shopper to an action module 406 and an analysis module 408.

In the embodiment shown in FIG. 5, action module 406 sends instructions to sales floor display 450 and/or other in-store terminals 451 to change what is displayed on sales floor display 450 and/or other in-store terminals 451. In embodiments, the instructions sent to sales floor display 450 change sales floor display 450 to show the shopper information relevant to the product currently being lifter, considered, or compared by the shopper. In embodiments, the instructions sent to other in-store terminals 451 change other in-store terminals 451 to show workers information relevant to the product currently being lifted, considered, or compared by the shopper. In embodiments, action module 406 contains definitions and parameters of automatic shopper services that workers implement on the sale floor.

In the embodiment shown in FIG. 5, analysis module 408 receives information from sensing module 404 regarding movements and/or attributes of the shopper and stores history of the movements of the shopper on storage device 461. In embodiments, the information stored on storage device 461 includes date of shopper movement, the product lifted, and the movement type of the shopper (lifting, considering, comparing, returning). In embodiments, analysis module 408 analyzes the information stored on storage device 461 and the information of the purchase history of the shopper stored on storage device 460, and the results of the analysis are displayed on, for example, back office display 470 as a report.

In the embodiment shown in FIG. 5, shopper analysis module 400, image capture device 440, motherboard 512, sensors 412, 422, 432, sales floor display 450, other in-store terminals 451, back office display 470, storage device 460, and storage device 461 are located on-site at the same location of sales floor 510. In other embodiments, one or more of shopper analysis module 400, motherboard 512, other in-store terminals 451, back office display 470, storage device 460, and storage device 461 are located remotely from the location of sales floor 510.

Figure 6:
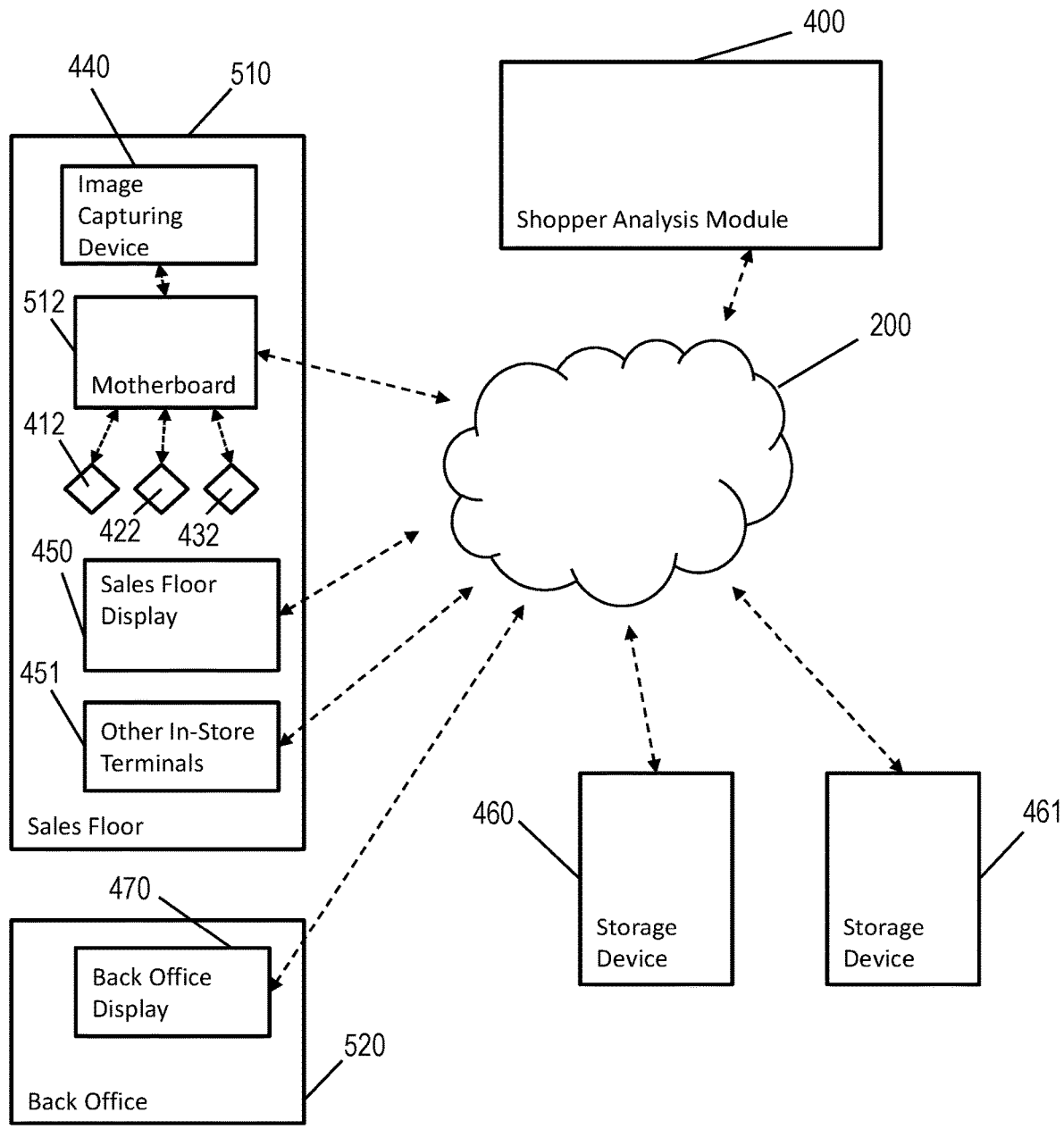
FIG. 6 shows a block diagram of an exemplary environment in accordance with aspects of the invention.

FIG. 6 shows an embodiment of the invention that operates using a network 200 such as, for example, cloud computing environment 50. Other than network 200, the embodiment shown in FIG. 6 includes the same elements as the embodiment shown in FIG. 5 and operates the same way as the embodiment shown in FIG. 5. For example, in the embodiment shown in FIG. 6, shopper analysis module 400, storage device 460, and storage device 461 are different nodes 10 in cloud computing environment 50 of FIG. 2. In other embodiments, one or more of shopper analysis module 400, motherboard 512, sales floor display 450, other in-store terminals 451, storage device 460, storage device 461, and back office display 470 are different nodes 10 in cloud computing environment 50 of FIG. 2.

Figure 7:
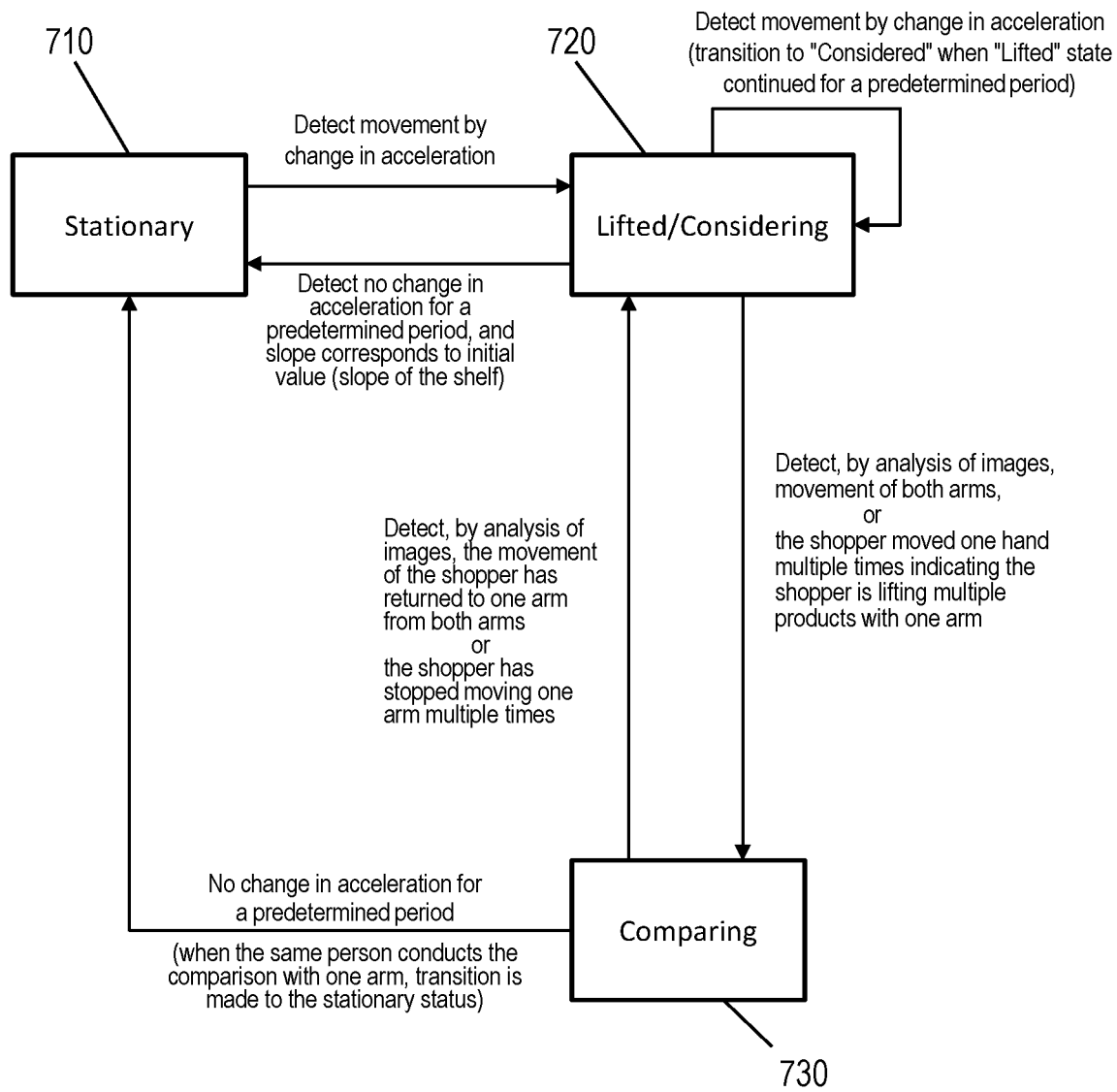
FIG. 7 shows a flow chart of an exemplary method in accordance with aspects of the invention.

FIG. 7 shows an example of how shopper analysis module 400 detects shopper status (e.g., lifting, considering, comparing, returning). In FIG. 7, block 710 represents the product, for example product A 410, in a stationary state. Block 720 represents the shopper lifting or considering the product, for example product A 410. Block 730 represents the shopper comparing two products, for example product A 410 and product B 420.

Beginning with product A 410 in a stationary state at block 710, shopper analysis module 400 detects movement of product A 410 resulting from a change in acceleration sensed by sensor A 412, which causes shopper analysis module 400 to determine that product A 410 has been lifted (block 720). As a result of shopper analysis module 400 detecting movement of product A 410 continuing for at least a predetermined period, shopper analysis module 400 determines that the shopper is now considering product A 410 (block 720).

Beginning from the lifted state (block 720), as a result of shopper analysis module 400 detecting, by the analysis of images from image capture device 440, that (a) the shopper moved both arms (indicating that the shopper is lifting product A 410 and product B 420 simultaneously), or (b) the shopper moved one hand multiple times (indicating that the shopper is lifting product A 410 and product B 420, one at a time, with one arm), shopper analysis module 400 determines that the shopper is comparing product A 410 and product B 420 (block 730).

Beginning from the comparing state (block 730), as a result of shopper analysis module 400 detecting, by the analysis of images from image capture device 440, that (a) the movement of the shopper has returned to one arm from both arms, or (b) the shopper has stopped moving one arm multiple times, shopper analysis module 400 determines that the shopper has returned to the considering state (block 720). If, however, at block 730, shopper analysis module 400 detects no change in acceleration of sensor 412 for a predetermined period, shopper analysis module 400 determines that the shopper has returned product A 410 to the shelf (block 710).

Beginning from the lifted or considering state (block 720), as a result of shopper analysis module 400 detecting no change in acceleration of sensor 412 for a predetermined period, shopper analysis module 400 determines that shopper has returned product A 410 to the shelf (block 710).

Figure 8:
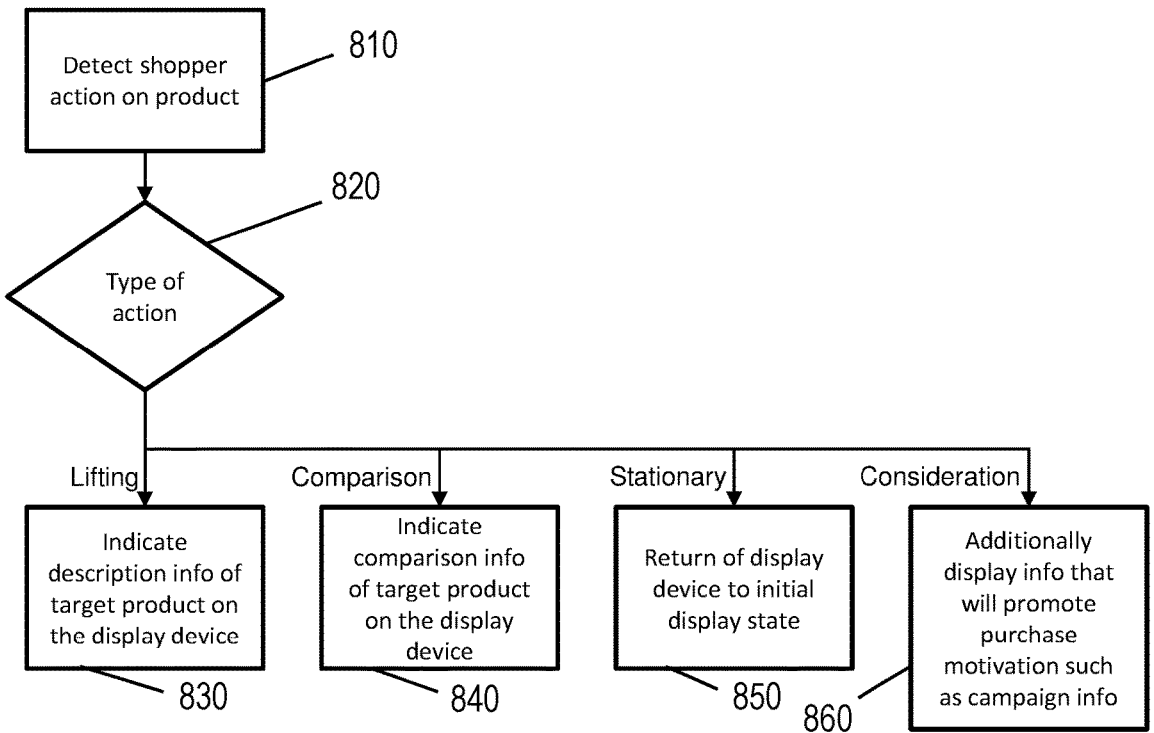
FIG. 8 shows a flow chart of an exemplary method in accordance with aspects of the invention.

FIG. 8 shows an example of an automatic shopper service that embodiments of the invention perform in real-time. At block 810, shopper analysis module 400 detects a shopper moving product A 410. At block 820, shopper analysis module 400 determines a type of action taken by the shopper relative to product A 410 (discussed above). As a result of shopper analysis module 400 determining that the shopper has lifted product A 410 (block 830), shopper analysis module 400 instructs sales floor display device 450 to display description information of product A 410. As a result of shopper analysis module 400 determining that the shopper is comparing product A 410 and product B 420 (block 840), shopper analysis module 400 instructs sales floor display device 450 to display comparison information of product A 410 and product B 420. As a result of shopper analysis module 400 determining that product A 410 is stationary (block 850), shopper analysis module 400 instructs sales floor display device 450 to return to an initial, or standard, display state. As a result of shopper analysis module 400 determining that the shopper is considering product A 410 (block 860), shopper analysis module 400 instructs sales floor display device 450 to display additional information of product A 410 that promotes purchase of product A1 410, such as, for example, sales campaign information.

Figure 9:
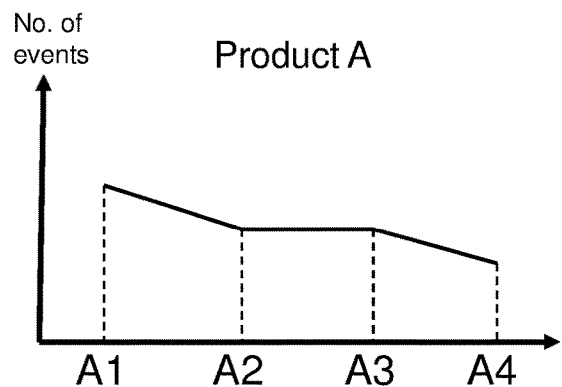
FIG. 9 shows a graph illustrating results of an exemplary method in accordance with aspects of the invention.
Figure 10:
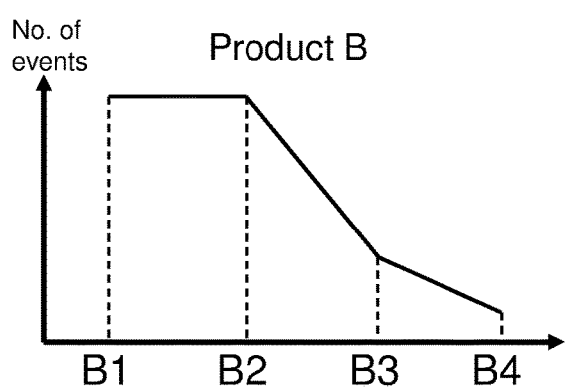
FIG. 10 shows a graph illustrating results of an exemplary method in accordance with aspects of the invention.

FIGS. 9 and 10 show an example of trend analysis in accordance with embodiments of the invention. In embodiments, shopper analysis module 400 determines an average time at which the shopper leaves the store (after considering a particular product, product A 410) by analyzing the number of times shoppers: recognized product A 410; exhibited interest in and attention to product A 410; understood content and recognized value of product A 410; compared and/or considered product A 410; and purchased product A 410. Accordingly, shopper analysis module 400 analyzes the tendency on a per-product basis of the time points of shoppers leaving the store in the purchase process by measuring the following elements on a per-product basis: the number of the times the description of product A 410 was displayed on the display device 450 (and the number of times product A 410 was recognized other than on sales floor display 450, if any); the number of times product A 410 was lifted; the number of times product A 410 was considered for at least a predetermined period of time; the number of times product A 410 was purchased.

FIG. 9 shows data for product A 410. Point A1 is the number of times shoppers recognized product A 410. Point A2 is the number of times shoppers exhibited interest in product A 410. Point A3 is the number of times shoppers understood content related to product A 410. Point A4 is the number of times shoppers purchased product A 410. Similarly, FIG. 10 shows data for product B 420. Point B1 is the number of times shoppers recognized product B 420. Point B2 is the number of times shoppers exhibited interest in product B 420. Point B3 is the number of times shoppers understood content related to product B 420. Point B4 is the number of times shoppers purchased product B 420.

Referring to FIGS. 9 and 10, in the case of product A 410, although it is recognized less frequently than product B 420 (point A1 is lower than point B1), product A 410, when recognized, catches the interest of shoppers with a higher probability of purchasing (point A4 is higher than point B4). On the other hand, although shoppers recognize product B 420 more frequently than product A 410, the horizontal line between points B2 and B3 indicates that product B 420 gets attention as frequently as it is recognized, but it is returned to the shelf more frequently than is product A 410 and, as a result, is purchased less frequently than product A 410. By analyzing the actions of shoppers, as shown in FIGS. 9 and 10 and described above, shopper analysis module 400 provides information that shows trends that are likely to lead to purchases. For example, in the case of clothing, analysis by shopper analysis module 400 reveals that a first color may be recognized (lifted) and shown more interest (considered) than a second color, but the second color may be purchased by more shoppers than the first color.

Embodiments of the invention result in: a reduction in opportunity loss by providing sales service with, for example, the automatic shopper service shown in FIG. 8; and improvement in the purchasing rate (contract rate) through measures to improve store placement through purchasing process analysis. Embodiments of the invention increase interaction with shoppers and analyze the purchasing process to reduce the exit rate (the rate of shoppers entering a store and walking out without buying anything) and increase the purchase rate. In this manner, implementation of the invention introduces conversion rate optimization in physical stores, which contributes to increased sales. In embodiments, shopper analysis module 400 analyzes the process of shoppers from visiting to walkout/purchasing more specifically and as personalized information. As a result, embodiments promote fundamental sales floor/store reform and a personalized automatic shopper service. Also, analysis of accumulated data enables utilization thereof in store design when a new store is to be opened.

In embodiments, a distance between sensors 412, 422, 432 and a receiver (motherboard 512) is within the range of communication systems such as Bluetooth and the motherboard is in a simple computing device such as a personal computer or a mobile terminal. In embodiments, sensors 412, 422, 432 are powered by coin batteries, and a receiver that relies on a mobile battery operates at a sufficient level for the system to function properly. As a result, a power source does not need to be provided at the point of purchase (location of the product). In embodiments, each sensor 412, 422, 432 has a universally unique identifier (UUID) and, as a result, product identification is extremely accurate. In embodiments, the accuracy of state-of-the-art acceleration sensors 412, 422, 432 achieve a high accuracy in the identification of the state of the product, and, for example, result in a real-time identification of one second or less. Embodiments of the invention are well suited for products such as cameras, mobile phones, cosmetics, etc., that have a display sample that is not actually purchased (so that an acceleration sensor is not required on every individual occurrence of the product).

Figure 11:
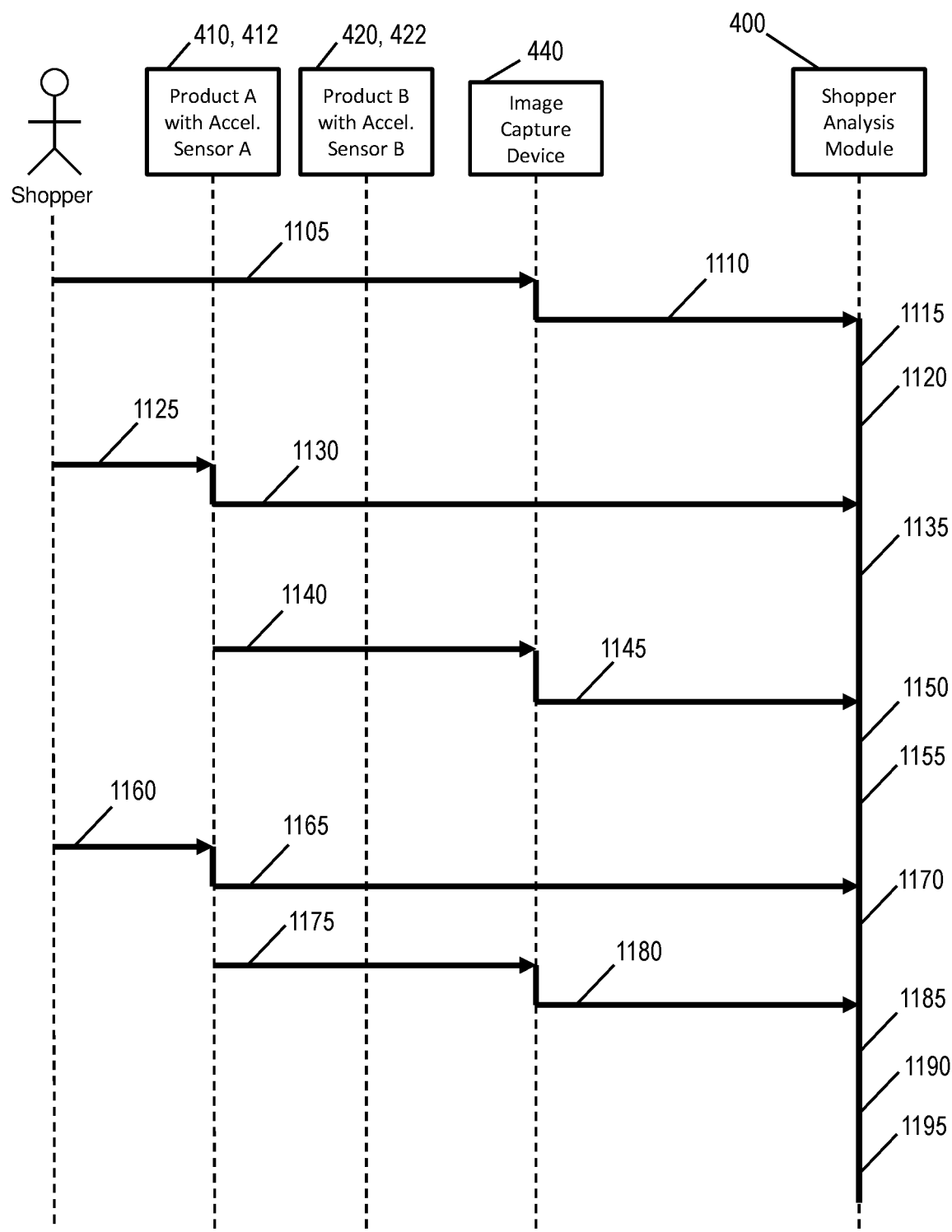
FIG. 11 shows a flow chart of an exemplary method in accordance with aspects of the invention.
Figure 12:
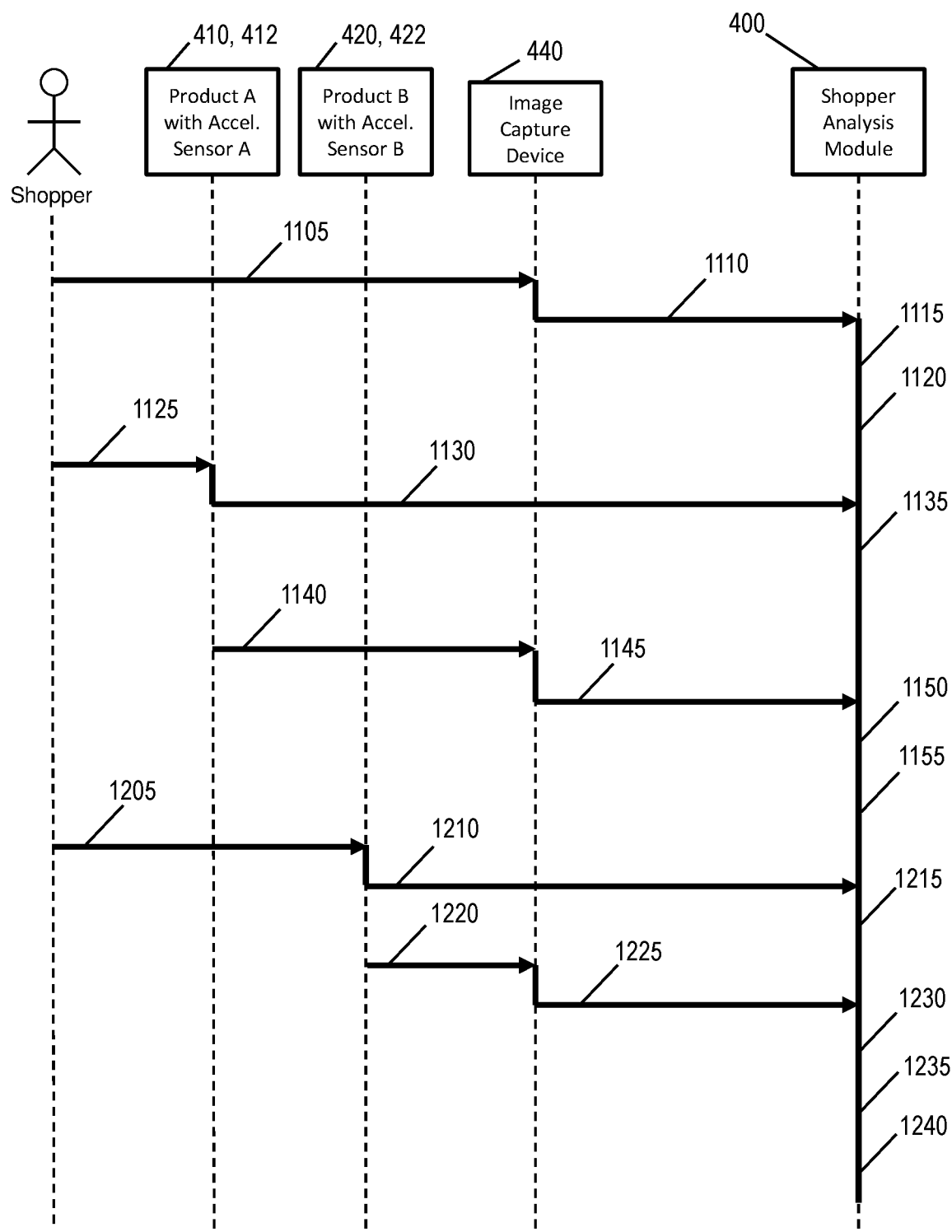
FIG. 12 shows a flow chart of an exemplary method in accordance with aspects of the invention.
Figure 13:
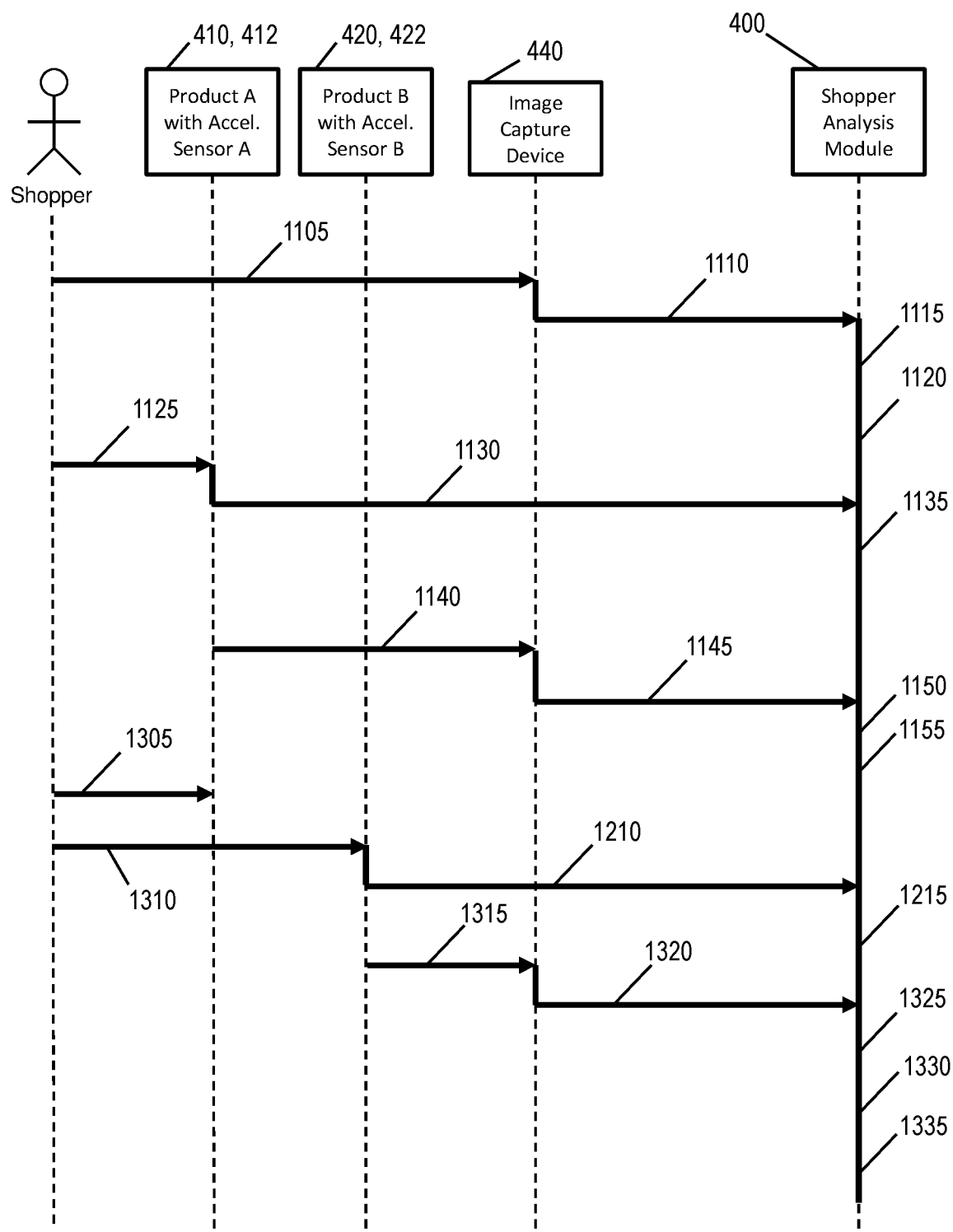
FIG. 13 shows a flow chart of an exemplary method in accordance with aspects of the invention.

FIGS. 11-13 show examples of sequences in accordance with embodiments of the invention of shopper analysis module 400 detecting lifting of a product, comparing two products using two hands, and comparing two products using one hand.

In FIG. 11, the shopper lifts product A 410 and replaces product A 410 on the shelf from which the shopper lifted product A 410. At 1105, a shopper is noticed by image capture device 440. At 1110, image capture device 440 captures an image of the shopper. At 1115, shopper analysis module 400 starts tracking movements of the shopper and, at 1120, begins pose estimation (identification of the shopper's skeletal position). At 1125, the shopper lifts product A 410 with their right hand. At 1130, shopper analysis module 400 receives sensor information from sensor A 412 and, at 1135, detects that product A 410 has been lifted. At this point shopper analysis module 400 has not yet identified the shopper. At 1140, image capture device 440 captures an image of the shopper using their right hand to lift product A 410. At 1145, image capture device 440 captures a video image of the shopper lifting product A 410 with their right hand. At 1150, shopper analysis module 400 determines that the shopper has lifted something with their right hand by using pose estimation and applies a time stamp to the lifting. At 1155, shopper analysis module 400 determines that the shopper has lifted product A 410 using their right hand by integrating the information from the pose estimation and the information from sensor A 412. At 1160, product A 410 is placed on a shelf. At 1165, sensor A 412 sends acceleration information regarding the placement of product A 410 on the shelf to shopper analysis module 400. At 1170, shopper analysis module 400 determines that product A 410 has been put somewhere but does not identify where product A 410 has been put. At 1175, image capture device 440 captures an image of the shopper putting product A 410 somewhere with their right hand. At 1180, image capture device 440 captures a video image of the shopper putting product A 410 somewhere with their right hand. At 1185, shopper analysis module 400 determines that the shopper has put something somewhere with their right hand but does not identify the something or the somewhere. Shopper analysis module 400 makes the determination at 1185 by using pose estimation and applies a time stamp to the placing. At 1190, shopper analysis module 400 determines that the shopper has put product A 410 on the shelf using their right hand by integrating the information from the pose estimation and the information from sensor A 412. At 1195, shopper analysis module 400 determines that it is the shopper who lifted product A 410 at 1125 because it is the shopper that replaced product A 410 at 1160.

In FIG. 12, the shopper compares product A 410 and product B 420 using two hands. The sequence shown in FIG. 12 includes many of the steps shown in FIG. 11 and those steps are identified using the same reference numbers used in FIG. 11. FIG. 12 differs from FIG. 11 in that the shopper uses their left hand to lift product B 420 to compare it with product A 410 that the shopper has lifted with their right hand (as shown in FIG. 11). At 1205, the shopper lifts product B 420 with their left hand while the shopper still holds product A 410 in their right hand (1155). At 1210, shopper analysis module 400 receives sensor information from sensor B 422 and, at 1215, detects that product B 420 has been lifted. At this point shopper analysis module 400 has not yet identified the shopper as the person that has lifted product B 420. At 1220, image capture device 440 captures an image of the shopper using their left hand to lift product B 420. At 1225, image capture device 440 captures a video image of the shopper lifting product B 420 with their left hand. At 1230, shopper analysis module 400 determines that the shopper has lifted something with their left hand by using pose estimation and applies a time stamp to the lifting. At 1235, shopper analysis module 400 determines that the shopper has lifted product B 420 using their left hand by integrating the information from the pose estimation and the information from sensor B 422. At 1240, shopper analysis module 400 determines that the shopper is comparing product A 410 and product B 420 because the shopper holds both of them at the same time.

In FIG. 13, a shopper lifts and compares product A 410 and product B 420 using one hand. The sequence shown in FIG. 13 includes steps shown in FIGS. 11 and 12 and those steps are identified using the same reference numbers used in FIGS. 11 and 12. FIG. 13 differs from FIG. 12 in that the shopper uses their right hand to lift product B 420 to compare it with product A 410 that the shopper has also lifted with their right hand (as shown in FIG. 11). At 1305, the shopper puts product A 410 on a shelf or some other place. At 1310, the shopper lifts product B 420 with their right hand. At 1210, shopper analysis module 400 receives sensor information from sensor B 422 and, at 1215, detects that product B 420 has been lifted. At 1315, image capture device 440 captures an image of the shopper using their right hand to lift product B 420. At 1320, image capture device 440 captures a video image of the shopper lifting product B 420 with their right hand. At 1325, shopper analysis module 400 determines that the shopper has lifted something with their right hand by using pose estimation and applies a time stamp to the lifting. At 1330, shopper analysis module 400 determines that the shopper has lifted product B 420 using their right hand by integrating the information from the pose estimation and the information from sensor B 422. At 1335, shopper analysis module 400 determines that the shopper is comparing product A 410 and product B 420 if the lifting of product A 410 (1125) and the lifting of product B 420 (1310) took place within a predetermined period of time.

In embodiments, in the sequences shown in FIGS. 11-13, the determination that the shopper used their right hand (or left hand) to lift something is matched with the corresponding acceleration sensor signal by matching time stamps of the video image and the acceleration sensor signal.

In embodiments, shopper analysis module 400 comprises sensor information reception module 402, sensing module 404, action module 406, and analysis module 408, each of which may comprise one or more program modules such as program modules 42 described with respect to FIG. 1. Shopper analysis module 400 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIGS. 4-6. In practice, the environment may include additional devices and/or networks; fewer devices and/or networks; different devices and/or networks; or differently arranged devices and/or networks than illustrated in FIGS. 4-6.

Figure 14:
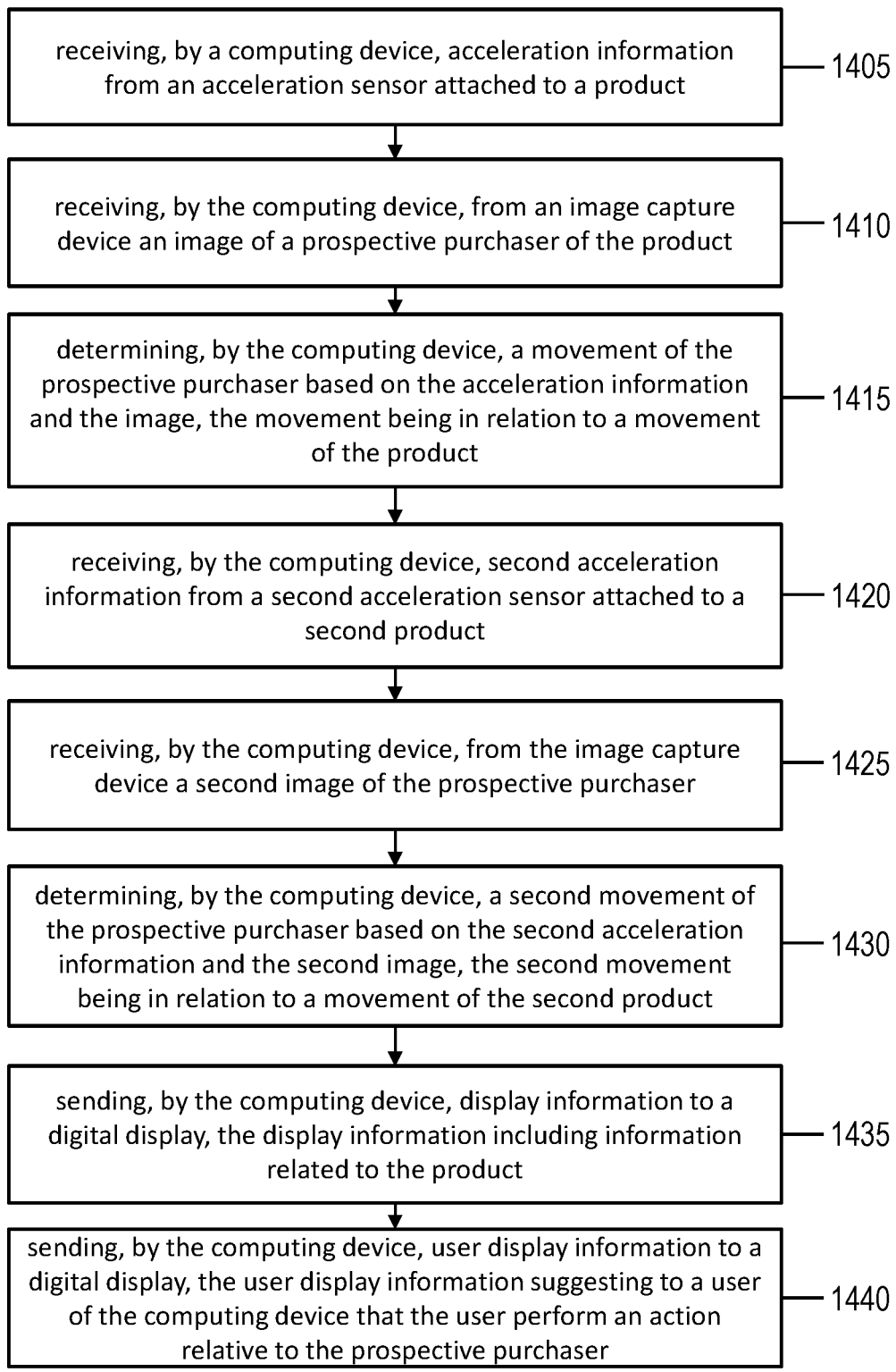
FIG. 14 shows a flowchart of an exemplary method in accordance with aspects of the invention.

FIG. 14 shows a flowchart of an exemplary method in accordance with aspects of the present invention. Steps of the method may be carried out in the environment of FIGS. 4-6 and are described with reference to elements depicted in FIGS. 4-6.

At step 1405, the system receives, by a computing device, acceleration information from an acceleration sensor attached to a product. In embodiments, and as described with respect to FIGS. 4-6, shopper analysis module 400 receives acceleration information from sensor A 412 attached to product A 410.

At step 1410, the system receives, by the computing device, from an image capture device an image of a prospective purchaser of the product. In embodiments, and as described with respect to FIGS. 4-6, shopper analysis module 400 receives from image capture device 440 an image of a prospective purchaser of product A 410.

At step 1415, the system determines, by the computing device, a movement of the prospective purchaser based on the acceleration information and the image, the movement being in relation to a movement of the product. In embodiments, and as described with respect to FIGS. 4-6, shopper analysis module 400 determines a movement of the prospective purchaser based on the acceleration information from sensor 412 and the image, the movement being in relation to a movement of product A 410.

At step 1420, the system receives, by the computing device, second acceleration information from a second acceleration sensor attached to a second product. In embodiments, and as described with respect to FIGS. 4-6, shopper analysis module 400 receives second acceleration information from sensor B 422 attached to product B 420.

At step 1425, the system receives, by the computing device, from the image capture device a second image of the prospective purchaser. In embodiments, and as described with respect to FIGS. 4-6, shopper analysis module 400 receives from image capture device 440 a second image of the prospective purchaser.

At step 1430, the system determines, by the computing device, a second movement of the prospective purchaser based on the second acceleration information and the second image, the second movement being in relation to a movement of the second product. In embodiments, and as described with respect to FIGS. 4-6, shopper analysis module 400 determines a second movement of the prospective purchaser based on the second acceleration information and the second image, the second movement being in relation to a movement of product B 420.

At step 1435, the system sends, by the computing device, display information to a digital display, the display information including information related to the product. In embodiments, and as described with respect to FIGS. 4-6, shopper analysis module 400 sends display information to sales floor display 450, the display information including information related to product A 410.

At step 1440, the system sends, by the computing device, user display information to a digital display, the user display information suggesting to a user of the computing device that the user perform an action relative to the prospective purchaser. In embodiments, and as described with respect to FIGS. 4-6, shopper analysis module 400 sends display information to back office display 470, the user display information suggesting to a user of shopper analysis module 400 that the user perform an action relative to the prospective purchaser of product A 410.

Figure 15:
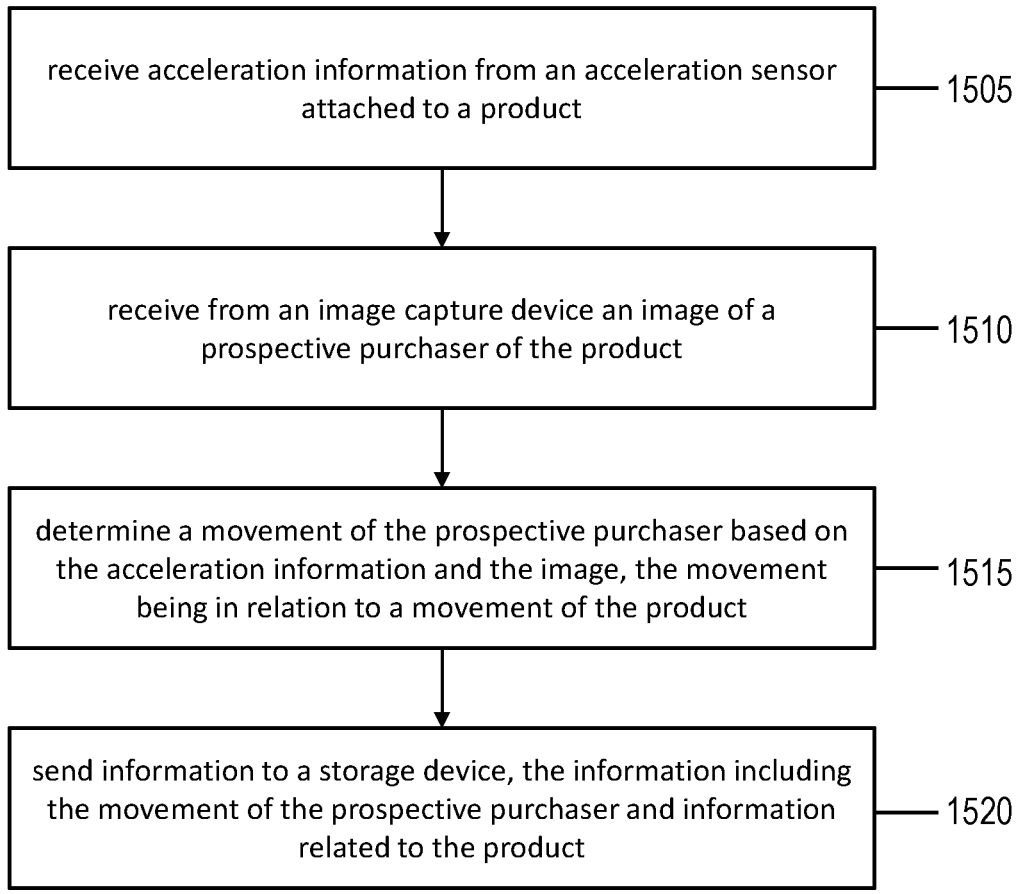
FIG. 15 shows a flowchart of an exemplary method in accordance with aspects of the invention.

FIG. 15 shows a flowchart of an exemplary method in accordance with aspects of the present invention. Steps of the method may be carried out in the environment of FIGS. 4-6 and are described with reference to elements depicted in FIGS. 4-6.

At step 1505, the system receives acceleration information from an acceleration sensor attached to a product. In embodiments, and as described with respect to FIGS. 4-6, shopper analysis module 400 receives acceleration information from sensor A 412 attached to product A 410.

At step 1510, the system receives from an image capture device an image of a prospective purchaser of the product. In embodiments, and as described with respect to FIGS. 4-6, shopper analysis module 400 receives from image capture device 440 an image of a prospective purchaser of product A 410.

At step 1515, the system determines a movement of the prospective purchaser based on the acceleration information and the image, the movement being in relation to a movement of the product. In embodiments, and as described with respect to FIGS. 4-6, shopper analysis module 400 determines a movement of the prospective purchaser based on the acceleration information and the image, the movement being in relation to a movement of product A 410.

At step 1520, the system sends information to a storage device, the information including the movement of the prospective purchaser and information related to the product. In embodiments, and as described with respect to FIGS. 4-6, shopper analysis module 400 sends information to storage device 460, the information including the movement of the prospective purchaser and information related to product A 410.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing device, acceleration information from an acceleration sensor attached to a product;
   receiving, by the computing device and from an image capture device, an image of a prospective purchaser of the product;
   determining, by the computing device, a movement of the prospective purchaser based on the acceleration information and pose estimation, the movement being in relation to a movement of the product, wherein the determining a movement of the prospective purchaser comprises utilizing a machine learning model that focuses on skeletal structures of the prospective purchaser based on the image; and
   sending, by the computing device, display information to a digital display, the display information including information related to the product,
   wherein, the movement of the product is based on the acceleration information.

2. The method of claim 1, wherein the movement of the prospective purchaser is the prospective purchaser lifting the product.

3. The method of claim 1, wherein the movement of the prospective purchaser is the prospective purchaser comparing the product to a second product.

4. The method of claim 1, wherein the digital display is located proximate to the product and the prospective purchaser.

5. The method of claim 1, wherein the machine learning model focuses on the skeletal structures of the prospective purchaser to determine that the prospective purchaser lifts and returns the product.

6. The method of claim 5, wherein the skeletal structures of the prospective purchaser indicate a posture of the prospective purchaser.

7. The method of claim 1, further comprising
   receiving, by the computing device, second acceleration information from a second acceleration sensor attached to a second product;
   receiving, by the computing device, from the image capture device a second image of the prospective purchaser;
   determining, by the computing device, a second movement of the prospective purchaser based on the second acceleration information and the second image, the second movement being in relation to a movement of the second product.

8. The method of claim 7, wherein the determining a movement of the prospective purchaser comprises utilizing the machine learning model that focuses on the skeletal structures of the prospective purchaser based on the image, and the determining a second movement of the prospective purchaser comprises utilizing the machine learning model based on the second image.

9. The method of claim 8, wherein the sending display information to a digital display is performed in real-time relative to the determining a movement of the prospective purchaser.

10. The method of claim 8, wherein the sending display information to a digital display is performed within one second of the determining a movement of the prospective purchaser.

11. The method of claim 8, wherein the movement of the prospective purchaser is the prospective purchaser lifting the product, and the second movement of the prospective purchaser is the prospective purchaser lifting the second product.

12. The method of claim 11, wherein the determining a movement of the prospective purchaser comprises determining that the prospective purchaser moved a first hand of the prospective purchaser.

13. The method of claim 12, wherein the determining a second movement of the prospective purchaser comprises determining that the prospective purchaser moved a second hand of the prospective purchaser.

14. The method of claim 1, wherein the computing device includes software provided as a service in a cloud environment.

15. A computer program product comprising one or more computer readable storage media having program instructions collectively stored on the one or more computer readable storage media, the program instructions executable to:

receive acceleration information from an acceleration sensor attached to a product, the acceleration information indicating a movement of the acceleration sensor;

receive from an image capture device an image captured by the image capture device of a prospective purchaser of the product;

determine a movement of the prospective purchaser based on the acceleration information and the image, the movement being in relation to a movement of the product; and send information to a storage device, the information including the movement of the prospective purchaser and information related to the product, wherein the determining a movement of the prospective purchaser comprises utilizing a machine learning model that focuses on skeletal structures of the prospective purchaser based on the image, and the movement of the product is based on the acceleration information.

16. The computer program product of claim 15, wherein the acceleration information includes a time stamp of when the movement of the acceleration sensor occurred, the image includes a time stamp of when the image was captured by the image capture device, and the determine a movement of the prospective purchaser comprises matching the time stamp of the acceleration information to the time stamp of the image.

17. The computer program product of claim 16, wherein the information related to the product comprises identifying information of the product.

18. A system comprising:

a processor, a computer readable memory, one or more computer readable storage media, and program instructions collectively stored on the one or more computer readable storage media, the program instructions executable to:

receive acceleration information from an acceleration sensor attached to a product;

receive from an image capturing device an image of a prospective purchaser of the product;

determine a movement of the prospective purchaser based on the acceleration information and pose estimation of the image, the movement being in relation to a movement of the product, wherein the determining a movement of the prospective purchaser comprises utilizing a machine learning model that focuses on skeletal structures of the prospective purchaser based on the image; and send user display information to a digital display, the user display information suggesting to a user of the computing device that the user perform an action relative to the prospective purchaser, wherein, the movement of the product is based on the acceleration information, and the action suggested is based on the determined movement of the prospective purchaser.

19. The system of claim 18, wherein the program instructions are further executable to:

determine an attribute of the prospective purchaser based on the image, and wherein the movement of the prospective purchaser is lifting the product.

20. The system of claim 18, wherein the movement of the prospective purchaser is comparing the product to a second product.

* * * * *